D. C. Lawrence.
Spring Scales.
Patented Aug. 20, 1861.
No. 33,091.
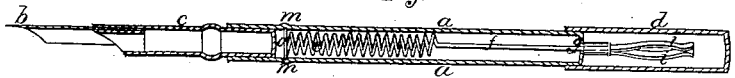
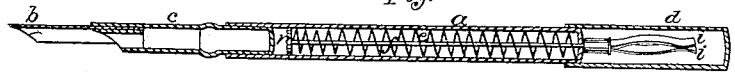
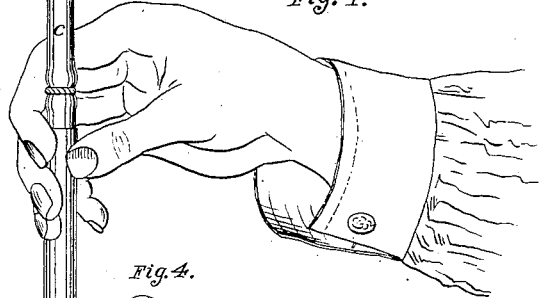
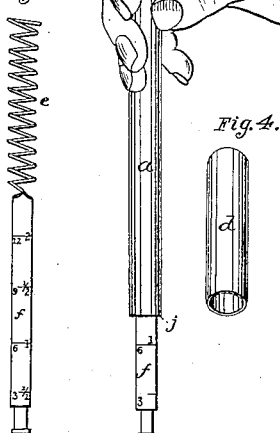
Witnesses:
Marcus Lane
Robt. W. Fenwick
Inventor:
D. Clinton Lawrence

UNITED STATES PATENT OFFICE.

D. CLINTON LAURENCE, OF CEDAR FALLS, IOWA.

COMBINED PENHOLDER AND LETTER-BALANCE.

Specification of Letters Patent No. 33,091, dated August 20, 1861.

*To all whom it may concern:*

Be it known that I, D. CLINTON LAURENCE, of Cedar Falls, Blackhawk county, and State of Iowa, have invented a certain new and useful instrument or implement which I term a Combined Writing-Pen and Letter-Weighing Apparatus; and I do hereby declare the following to be a full, clear, and exact description of the same, reference being had to the accompanying drawings, making a part of this specification, in which—

Figure 1. represents a view of the combined pen and weighing apparatus in the hand of the user. Fig. 2. represents a longitudinal section through the entire apparatus. Fig. 3. represents a view of the implement or apparatus, showing by red lines how the pen may be secured in the tube that constitutes the handle or case for holding the apparatus, or its parts. Fig. 4. represents a shield for protecting the pen, or the jaws, that hold the letter, or both. Fig. 5. represents a longitudinal section of a modification of the construction shown in Fig. 2, the difference being mainly, that in the first named figure the weight compresses, while in the last named figure the weight elongates the spring—the principle being the same in both cases—and the construction varying but slightly.

Similar letters of reference where they occur in the several figures, denote like parts of the apparatus in all the drawings.

A convenient, accurate, portable, letter-weighing apparatus, has long been sought for, but never heretofore made, or put into general use. With a view of supplying this much desired apparatus, I have combined it with a pen, so that the same instrument that writes a letter, may be made the instrument by which its weight, or cost of transportation by mail may also be ascertained. And that this instrument or apparatus may be reliable, I have divested it of everything likely to disarrange it, or put it out of order;—its extreme simplicity not only lessens it in price, but lessens the liability of getting out of order. So that I produce an apparatus that is reliable, very cheap, portable, and that has never heretofore been a commercial article, or on sale, or in use.

My invention consists in combining with an instrument for writing a letter an apparatus for ascertaining its weight, or cost of transportation, or both, as will be explained.

To enable those skilled in the art to make and use my invention, I will proceed to describe the same with reference to the drawings.

$a$, is a light metallic tube, such as are now in use for penhandles, and having a pen $b$, and a pen-holder $c$, at one end of said tube or handle. The object of the pen-holder $c$, is simply that it may be put into the tube either end foremost, for the purpose in the first place of so placing the pen as to be conveniently used, and secondly for protecting it, when not in use, by sliding it into the tube. But of course any other pen, or pen-holder may be used instead of that represented and described,—and by "pen," I desire to be understood as meaning any known instrument for writing or marking. And instead of reversing the pen-holder, or having to remove the pen from its position for security against injury in carrying it, a shield—such as that shown at $d$, Fig. 4, may be slipped over it.

In the tube $a$, or that part of the apparatus that constitutes the pen-handle, there is a spiral spring $e$, and a rod $f$; the spring may be entirely concealed within the tube, so as to be shielded from any injury; and the rod $f$, projects through a suitable slot or opening at the end $g$ of the tube, and is furnished with a pair of spring jaws or holders $i$, that will receive and hold a letter between them, as shown in red in Fig. 1. The rod $f$, I prefer to have flattened, so as to mark upon it the figures that denote the weight of the letter held between the jaws $i$, or the amount of postage, at any fixed rate for weight, as also to prevent it from turning around in the tube. And this rod, as in Fig. 2, may be separate from the spring $e$, and have a button $n$ to prevent it from leaving the spring.

As shown in Fig. 2, the act of weighing compresses the spring $e$, and the weight is exposed, or signified, by the drawing out of the rod $f$, as shown in Fig. 1, where the supposed, or imaginary letter there shown weighs more than one ounce, but not exceeding one ounce and a half, and the postage is therefore indicated as nine cents. In Fig. 5, however, I have shown the spring and rod, as being in one piece, and the button dispensed with—the spring being held in place by simply milling the tube as at $m$, and making the last coil of the spring—as at $o$, large enough to catch into, and hold itself in said milled, or otherwise formed groove or recess; and thus arranged, the act of weighing, elongates the spring; but the rod $f$ is drawn out of the tube, and exposes the figures or marks thereon, in precisely the same manner as that above described.

The half-lines on the face of rod $f$, indicate "half-ounce" weight; and full lines, or the lines which extend across the face of rod $f$, indicate "ounce" weight; and the number of ounces and an excess in half-ounces, up to the capacity of the weighing apparatus, are indicated in figures at said lines. This is clearly shown in Fig. 6, in which the capacity of the scale extends up to two ounces. In using the implement for the purpose of weighing letters, the following directions may be observed, viz.: When the rod $f$ is drawn down from the bottom $j$ of tube $a$, a less distance than the first half-line on said rod, or so that said half-line and bottom $j$ will coincide, then the postage will be 3 cents, which postage is indicated by the appropriate figure on the left hand side of said rod; when the rod $f$ is drawn down so as to expose the space anywhere between the first half-line, and the first full, or ounce line, or, so that the ounce line and bottom $j$ will coincide, then the postage is six cents, which postage is indicated by the appropriate figure on the left hand side of said rod: and when the rod $f$ is drawn down so as to bring the first full, or ounce line, below the bottom $j$, then the postage is 9 cents; which postage is indicated by the appropriate figure on the left hand side of said rod; and so on to the extent of the capacity of the scale; the rate of United States postage on letters, being, for any weight less, and up to a half ounce, 3 cents; and 3 cents additional for every additional half ounce, or fraction of an ounce. Of course, it is apparent, that if the rate of postage should at any time be changed, such new rate, could readily be adapted to the implement. And it is also apparent, that two distinct rates of postage could be indicated by the implement; as for instance,—the "United States" postage could be indicated on one side of the rod $f$, and the rate of postage of the "Canadas," on the opposite side of said rod.

To protect the jaws from injury, by carrying this implement, or apparatus, in the pocket, a shield or sleeve $d$, as at Fig. 4, may be used. The advantage of having the spring jaws to protrude from the tube, is this, that the letter is much more easily inserted between the jaws—otherwise the jaws might be allowed to draw themselves within the tube.

The shields that protect the pen, and spring jaws, instead of being detached from the pen-handle, may be made telescopic, so as to slide over the parts to be protected; and when these parts are to be used, then the shield, or shields may be slid back onto, or into, the handle. The pen-holder $c$, may be dispensed with if preferred, and the pen secured immediately to the tube in any of the usual well known ways, and thus the tube or handle be made shorter, or more of its interior be economized. The spring $e$ should be made so as to work within tube $a$ without coming in contact therewith so as to endanger accuracy in weighing. The whole apparatus can be easily placed within the length of an ordinary pen-handle.

Having thus explained the nature and object of my invention, what I claim is—

A combined writing instrument, and weighing apparatus, constructed and operating substantially as herein described.

D. CLINTON LAURENCE.

Witnesses:
MARCUS LANE,
ROBT. W. FENWICK.